United States Patent [19]
Glawson

[11] Patent Number: 5,655,584
[45] Date of Patent: Aug. 12, 1997

[54] TIMBER HARVESTING APPARATUS AND METHODS

[75] Inventor: Steven Fuller Glawson, Macon, Ga.

[73] Assignee: Environmental Timber Management, Inc., Macon, Ga.

[21] Appl. No.: 491,519

[22] Filed: Jun. 16, 1995

[51] Int. Cl.$^6$ ................................................ A01G 23/08
[52] U.S. Cl. .................... 144/335; 144/4.1; 144/34.1; 144/24.13; 144/343
[58] Field of Search ................... 144/4.1, 24.13, 144/34.1, 334, 335, 336, 338, 343

[56] References Cited

U.S. PATENT DOCUMENTS

| | | | |
|---|---|---|---|
| 2,635,654 | 4/1953 | Gerdine | 144/335 |
| 3,460,594 | 8/1969 | Burkhalter | |
| 3,643,709 | 2/1972 | McColl | 144/4.1 |
| 3,720,246 | 3/1973 | David | 144/4.1 |
| 3,736,971 | 6/1973 | Paul | |
| 3,856,060 | 12/1974 | Savage et al. | 144/335 |
| 3,911,982 | 10/1975 | Ervin et al. | 144/335 |
| 4,846,092 | 7/1989 | Wilson | |

OTHER PUBLICATIONS

Cost, Noel, "Hardwood Resources in the Southeast—Wetlands and Uplands" (Abstract), presentation for Southeast Section of Change in Southern Wood Products (1987).
Czerpinski, Frank P., "Small Tree Swamp Harvesting; Problems & Possible Solutions," presentation of Forest Products Research Society conference, Harvesting Small Timber: Waste Not, Want Not, Syracuse, NY, Apr. 28–30, 1981. Proceedings, Kendall/Hunt Publishing Company, Dubuque, IA, pp. 89–92.
Greene, Dale, "Harvesting In Wetlands—Challenges And Opportunities," TOPS, (Fall, 1988:50–52).
Jackson, Ben D., "Logging Wet Sites with a Tree–Length Forwarded," Paper No. 87–1568, presentation for American Society of Agricultural Engineers, St. Joseph, MI (Winter, 1987).

Kelly, T. H., Jr., Harvesting Wetland Hardwoods, Jan. 3, 1985.
Stephenson, Everett H., "Specialized Equipment to Reduce Soil rutting," Timber Harvesting and Forest Soil Rutting Workshop, Wakefield, VA, Mar. 6–7 (1990).
E. H. Stephenson, Trip Report, Scott Paper Swamp Logging, Apr. 11, 1985, and contained in the Union Camp Library in Savannah, Georgia.
Stokes Bryce J., "Wetland Logger Survey Summary and Production and Costs of Selected Wetland Logging Systems," Report of SETD Wetland Logging Task Force, American Pulpwood Association, Inc., Washington, DC (1988).
Willingham, Phil, "Wetland Harvesting Systems for the Mobile Delta" (Abstract and Background), presentation for Southern Regional Council on Forest Engneering, Auburn, AL, May 3–4 (1989).
Logging History materials, pp. 149–151, dated prior to Jun. 16, 1995 (the filling date for U.S.S.N. 08/491,519, for *Timber Harvesting Apparatus and Methods*), and contained in the Union Camp Library in Savannah, Georgia.
Trip Report, Pee Wee Temple Logging Operation, Franklin Region, May 4, 1990, and contained in the Union Camp Library in Savannah, Georgia.
Color brochure, "The Swamp Belongs to KORI," KORI, Lafayette, Louisiana dated prior to Jun.16, 1995 (the filing date for U.S.S.N. 08/491519, for *Timber Harvesting Apparatus and Methods*).
Prentice® color brohure, "Series 610 Stationary Mounted Loaders," Blount, Inc. Form No. 608–1291.
"KORI Model 225 Amphibious Excavator at Work," Videotape, dated prior to Jun. 16, 1995 (the filing date for U.S.S.N. 08/491,519, for *Timber Harvesting Apparatus and Methods*).

*Primary Examiner*—W. Donald Bray
*Attorney, Agent, or Firm*—John S. Pratt; Kilpatrick Stockton LLP

[57] ABSTRACT

Timber harvesting apparatus and methods for use in swampland utilizing an amphibious feller-buncher, an amphibious de-limber, an amphibious log carrier, and an amphibious service vehicle.

3 Claims, 4 Drawing Sheets 5,655,584

TIMBER HARVESTING APPARATUS AND METHODS

This Invention relates to timber harvesting equipment and methods accomplishing timber harvesting in swamplands or wetlands.

BACKGROUND OF THE INVENTION

Substantial portions of the United States and other areas of the world are commonly known as "swamplands" or "wetlands" and have land that is very moist or covered by standing water at least during rainy periods.

Many such areas support timber growth extremely well, and timber often grows in such areas at a substantially faster rate than in other areas. Indeed, most such areas in the United States have previously been logged, sometimes multiple times.

The earliest logging in such areas typically was float logging, in which trees were girdled to die and dry while standing and then felled and floated out. However, modern logging is quite difficult, if not entirely impractical, utilizing conventional logging methods during periods that such swamplands are wet.

Conventional logging methods for harvesting timber in such areas, when wet, include the use of helicopters to remove saw timber, the use of cable-pulled sleds to remove timber, the use of a yarder system, in which cables attached to timber or a sled pass over a tall tower, and the use of lifting balloons to assist in removing the timber. See e.g., Willingham, Phil, "Wetland Harvesting Systems for the Mobile Delta," Southern Regional Council on Forest Engineering Meeting, Auburn University, Alabama May 3–4, 1989.

Because of the problems associated with such methods, generally timber has been harvested in swamplands only during dry periods when conventional timber harvesting equipment can be driven across the land. Because such dry periods increase the quantity of accessible timber in a particular location or region, timber prices in such regions tend to be decreased. Accordingly, if it is possible economically to harvest timber from swamplands during wet periods, doing so is particularly profitable because timber prices during such periods tend to be higher.

It is thus an object of the present invention to provide apparatus and methods for harvesting swampland timber during wet periods on an economical basis.

It further object of the present invention to provide apparatus methods for harvesting swampland timbers that do not permanently damage swamplands by unduly dislocating or compacting soils, or by requiring the construction of bridges, elevated roadways, drainage ditches or the like.

It further object of the present invention to provide methods apparatus for harvesting swampland timber that can easily and economically traverse ponds, creeks, rivers and other relatively deep bodies of water of the type that frequently are present in such regions.

It is an additional object of the present invention to provide methods and apparatus for harvesting swampland timber that make possible the maintenance and re-supply of apparatus utilized in such activities.

These and objects and benefits of the present invention will be further appreciated by reference to the following brief description of the invention, the appended drawings, the detailed description of those drawings, and the claims.

BRIEF DESCRIPTION OF THE INVENTION

The present invention accomplishes swampland or wetlands timber harvesting utilizing amphibious track-driven vehicles combined with timber-felling, de-limbing, hauling and service equipment, specialized techniques for use of such apparatus.

The amphibious vehicles include a pontoon structure which provides flotation and a base for mounting equipment, a propulsion system which supplies power to drive the vehicle and, where appropriate operate equipment, and continuous tracks that surround the pontoons and propel the vehicle across ground, water, or swampy combinations: of both.

The first amphibious device of the present invention is an amphibious feller-buncher created by mounting a conventional feller-buncher head, a boom, a power plant and a cab on an used to fell trees and, where desired, remove stumps, such as stumps within a hauling road that is typically needed in practicing the present invention.

After felling trees, the limbs are removed essentially or literally where the trees have fallen utilizing an amphibious de-limber created by mounting a de-limbing apparatus on an amphibious track-driven vehicle. The amphibious de-limber not only removes limbs but, if desired, also cuts logs to predetermined lengths.

The de-limbed logs are loaded on an amphibious log carrier using the de-limber and/or using a boom also mounted on the amphibious log carrier, which includes a boom and log cradle mounted on an amphibious track-driven vehicle. Logs are hauled out of the swamp on the log carrier for transfer to trucks or further processing.

An amphibious service vehicle outfitted with a fuel tank, an air compressor, a welder, and other similar devices provides refueling and service for the amphibious feller-buncher, amphibious de-limber, and amphibious log carrier in the swamp, thereby increasing efficiency and decreasing down time in practicing the timber harvesting method of the present invention.

In practicing the present invention, typically the amphibious feller-buncher is used to clear a hauling road twenty to forty feet wide. The hauling road is generally centrally located in a swampland timber tract to be clear cut. The amphibious feller-buncher is not only to cut all trees in the hauling road, but also to stumps.

The an amphibious feller-buncher is then used to cut and lay down, preferably in a herringbone pattern, timber located alongside branch roads located generally transverse to the hauling road. Branch road need not be as extensively cleared; stumps may, for instance, be left in the path of branch roads.

The amphibious de-limber is then used to remove limbs and, if desired, cut to predetermined lengths the logs felled by the amphibious feller-buncher. Those logs are loaded onto the amphibious log carrier using the de-limber and/or a boom mounted on the amphibious log carrier. The log carrier is then used to haul the logs out of the swamp and transfer them to trucks for further processing in the normal manner.

DETAILED DESCRIPTION OF THE DRAWINGS

Amphibious Feller-Buncher

Figure 1:
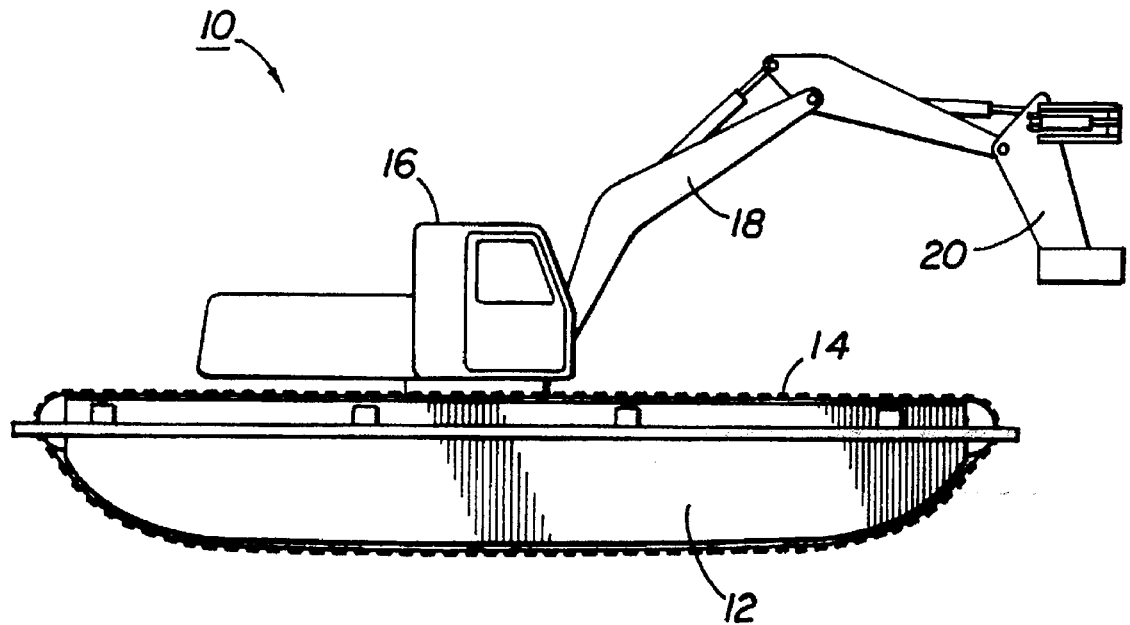
FIG. 1 is a schematized side elevation view of the amphibious feller-buncher of the present invention.
Figure 2:
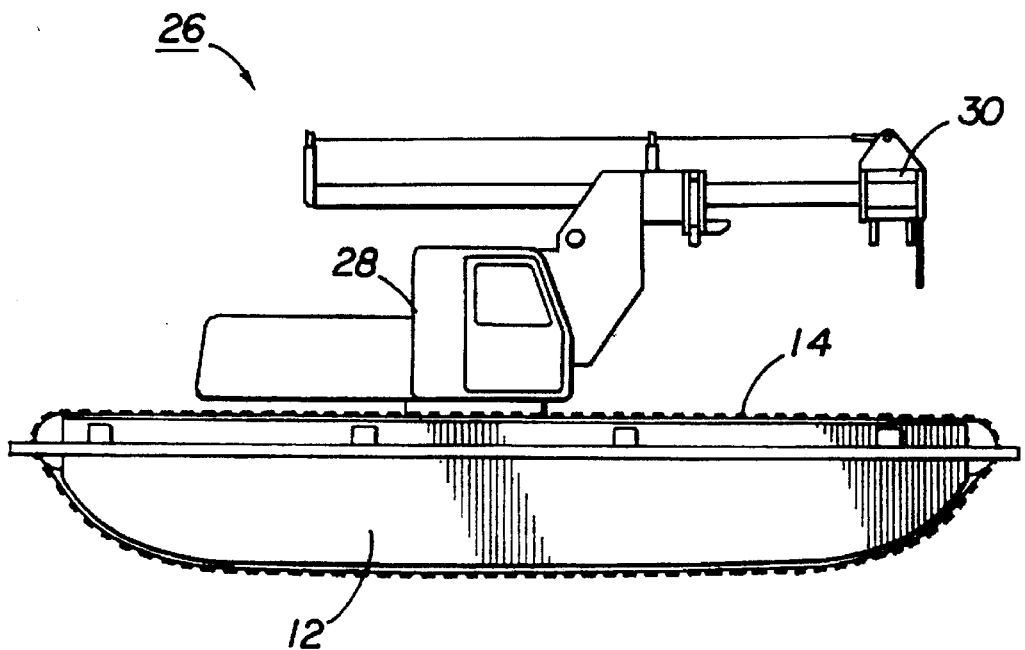
FIG. 2 is a schematized side elevation view of the amphibious de-limber of the present invention.

FIG. 1 schematically illustrates the amphibious feller-buncher 10 of the present invention comprising amphibious pontoon tanks 12, tracks 14, cab and power plant 16, boom 18, and feller-buncher head 20. The amphibious tank 12 and track 14 apparatus utilized in feller-buncher 10 may be a wide variety of known "swamp buggy" or "marsh buggy" devices such as, for instance, devices sold by Kori Corporation, of Lafayette, La; Wilco Marsh Buggies and Draglines, Inc., of Marrero, La; Quality Industries, Inc., of Thibodaux, La. and other companies. Such device are described, for instance, in U.S. Pat. No. 4,846,092, which is incorporated herein in its entirety by reference.

The cab and power plant 16 and boom 18 apparatus of amphibious feller-buncher 10 may be a Caterpillar Model 325L excavator, available from Caterpillar Corporation of Peoria, Ill., and feller-buncher head 20 may be a DIKA Super Saw 28" feller-buncher available from DIKA Industries, Ltd. of Rycroft, Alberta, Canada. As will be understood by those skilled in the art, other power plant and boom devices and other feller-buncher heads may also be used. The feller-buncher head 20 can operate under water, thereby making it possible to leave very short stumps, even in locations where trees being harvested are surrounded by standing water.

Amphibious De-limber

Amphibious de-limber 26 like amphibious feller-buncher 10, utilizes pontoon tanks 12, each of which are surrounded by tracks 14. A cab and power plant 28 mounted above and between tanks 12 provides power for the tracks 14, swivels, and powers de-limber 30, which is attached to cab and power plant 28. Cab and power plant 28 may be a John Deere Model 790D made by the John Deere Company of Waterloo, Iowa, or, as will be understood by those skilled in the art, other appropriate apparatus. De-limber 30 may be a Denis Model DM3000 available from Denharco Delimbers of St. Julie, Quebec, Canada.

Figure 3:
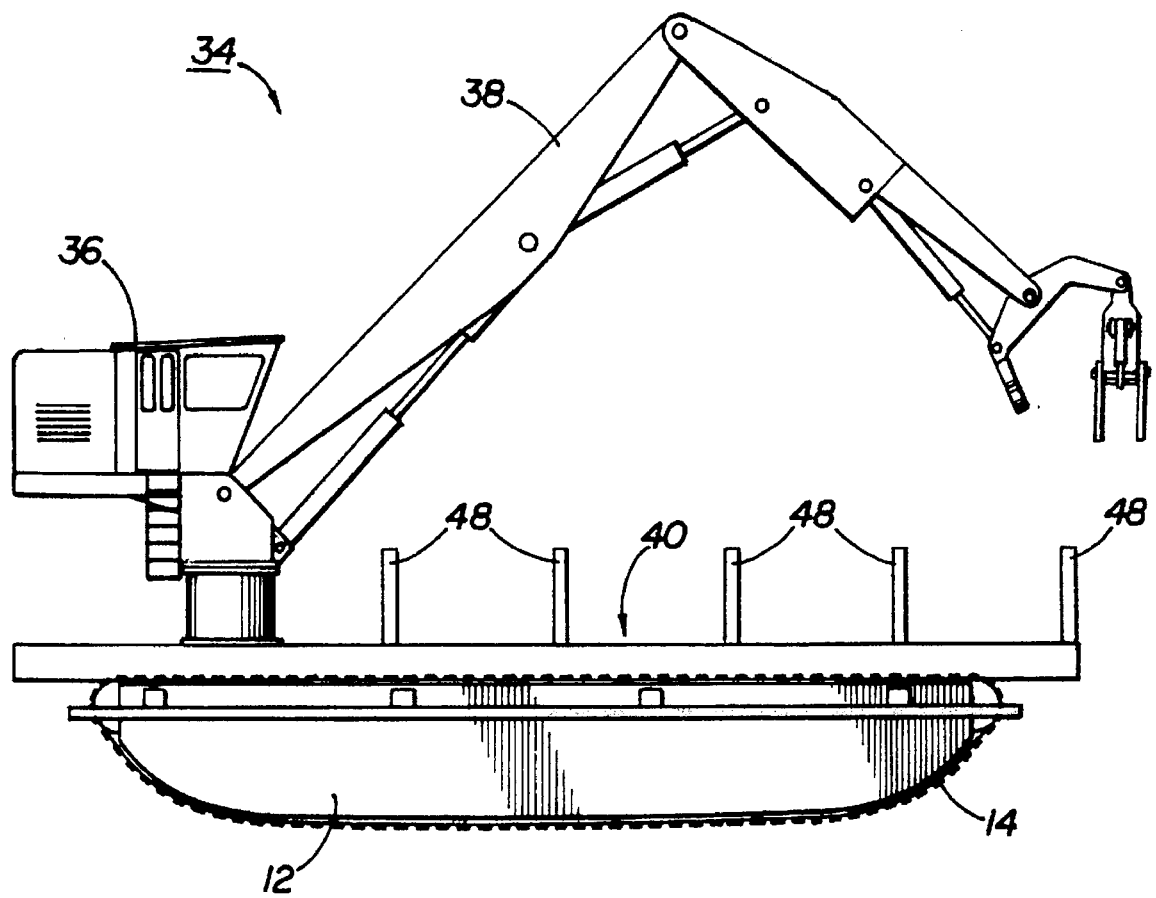
FIG. 3 is a schematized side elevation view of the amphibious log carrier of the present invention.
Figure 4:
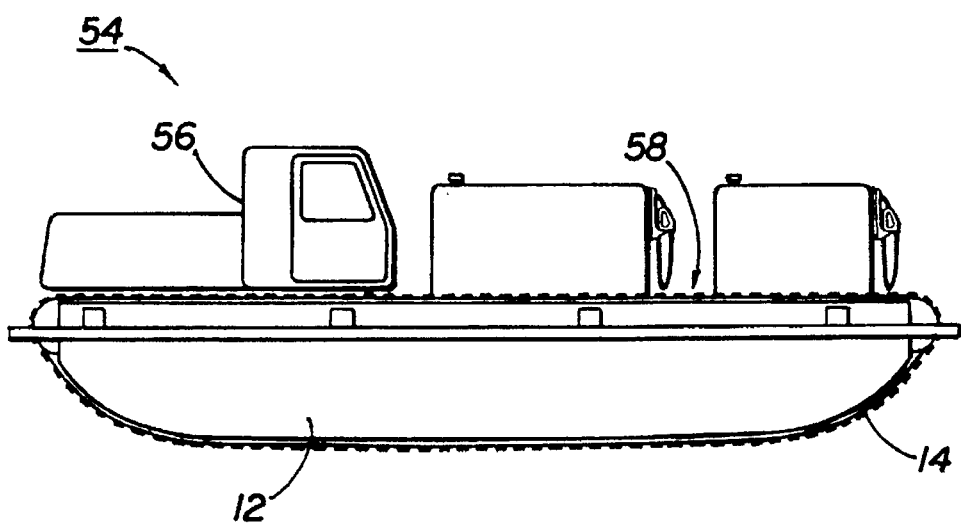
FIG. 4 is a schematized side elevation view of the amphibious service vehicle of the present invention.
Figure 5:
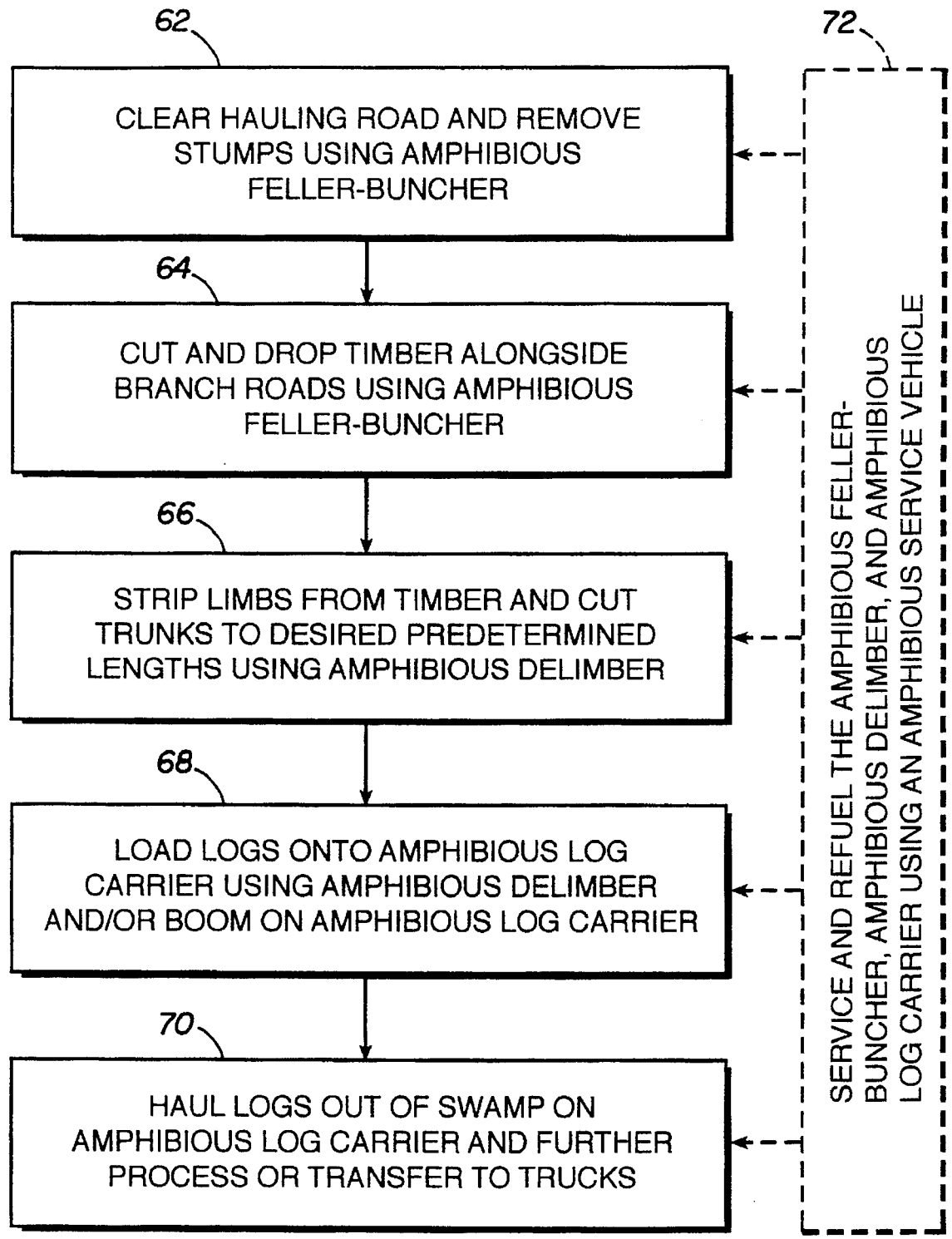
FIG. 5 is a flow diagram showing the principal steps in the swampland timber harvesting method of the present invention.

As is described above, the de-limber 30 is capable of picking up the timber with branches attached and peeling the branches off by feeding the trunk through a funnel to shuck the branches off. An optional measuring device together with a chain saw apparatus that is part of the de-limber 30 may be used to cut the trunk to predetermined lengths. The boom-like properties of the de-limber 30 permit it to be used to drop trunk sections in desired locations, such as onto the amphibious log carrier 34 shown in FIG. 3.

Amphibious Log Carrier

Like amphibious feller-buncher 10 and amphibious de-limber 26, amphibious log carrier 34 uses a conventional pontoon apparatus comprising pontoon tanks 12 surrounded by treads 14. A power plant and boom control 36 is mounted between pontoon tanks 12 near one end of amphibious log carrier 34 to provide power to tank treads 14 and operate knuckle boom 38, which swivels together with cab 36 and may be used to lift logs onto or out of a cradle 40 mounted on top of pontoon tanks 12.

Figure 7:
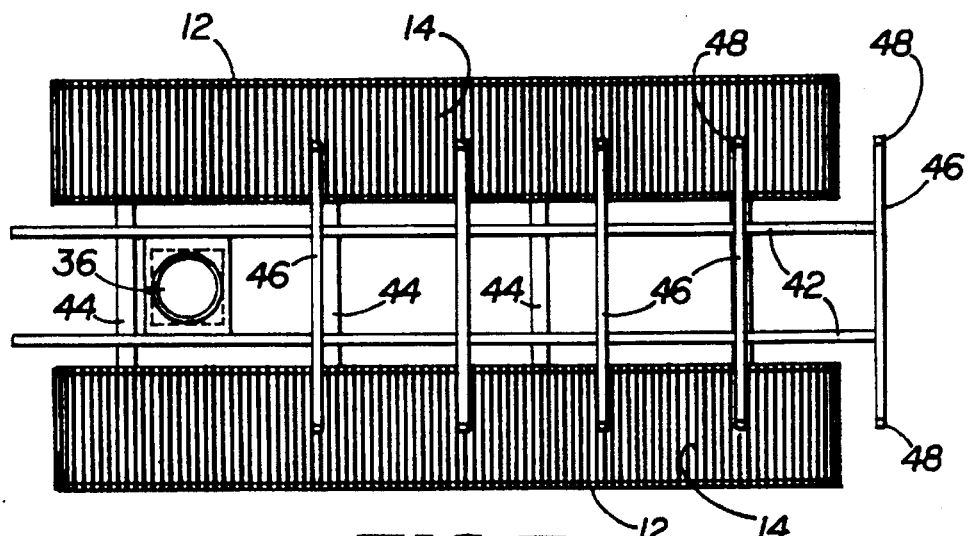
FIG. 7 is a schematized top plan view of the log carrier shown in FIG. 4.

As will be appreciated by those skilled in the art, cradle 40 may be fabricated in a number of different ways. Among these, it may be formed by mounting a pair of spaced-apart longitudinal beams 42 (visible in the top plan view of amphibious log carrier 34 shown in FIG. 7) on top of cross-members 44 that join pontoon tanks 12. Attached transverse to beams 42 are arms 46, the ends of which support posts 48 (visible in FIG. 3). Thus, as will be apparent by comparison of FIGS. 3 and 7, beams 42, arms 46, and posts 48 form a cradle within which logs may be positioned parallel to beams 42

Amphibious Service Vehicle

Amphibious service vehicle 54 includes pontoon tanks 12, each of which is surrounded by a track 14, a cab and power plant 56, and a tank and tool-mounting platform 58 on which or within which fuel tanks, air compressors, welding machines and other tools may be carried into the swamp and used to fuel and service the previously-described amphibious vehicles.

Timber Harvesting Method

Figure 6:
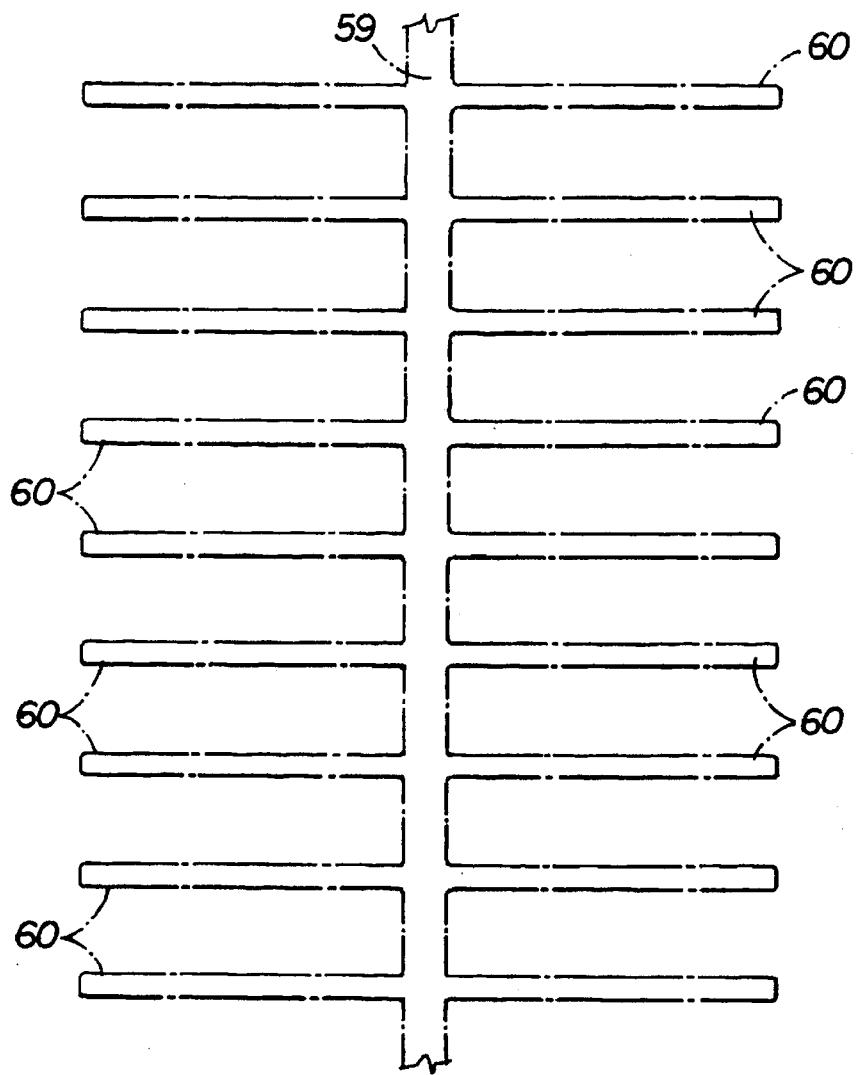
FIG. 6 is a schematic diagram of a swampland timber tract being clear cut utilizing the apparatus and methods of the present invention showing typical haul road and branch roads locations.

The method of the present invention may be practiced on a timber tract indicated by numeral 57 in FIG. 6. First (in step 62) a hauling road 59 (shown in FIG. 6) is cleared to traverse a portion of the swampland timber tract 57 to be clear cut by removing trees and any stumps within the path of such road 59 that may become obstructions using the amphibious feller-buncher 10 of the present invention.

In step 64, the amphibious feller-buncher 10 of the present invention is used to cut and drop timber alongside branch roads 60 in timber tract 57 shown in FIG. 6.

In step 66, limbs are stripped from the previously-cut timber, and trunks are cut to desired predetermined lengths utilizing amphibious de-limber 26 of the present invention.

In step 68, logs are loaded onto amphibious log carrier 34 of the present invention utilizing amphibious de-limber 26 and/or the boom 38 on amphibious log carrier 34.

In step 70, logs are hauled out of the swampland along haul road 59 on amphibious log carrier 34 for further processing or transfer to trucks positioned on dry land or barges or other vessels located on navigable waterways.

Servicing and refueling step 72 is accomplished utilizing the amphibious service vehicle 54 of the present invention by driving the amphibious service vehicle 54 into the swampland tract 57 along haul road 59 and, when necessary, along one of branch roads 60.

The foregoing is provided for the purposes of explanation and illustration of the invention. Modifications may be made without departing from the scope or spirit of the invention.

I claim:

1. A method for harvesting timber in swampy land, comprising the steps of:
    (a) using an amphibious feller-buncher to clear a hauling road on the swampy land by removing entire trees from the ground in a portion of the swampy land so that a path is established that is free of trees and stumps,
    (b) cutting trunks of trees growing on the swampy land using an amphibious feller-buncher by severing the trunks near the land and permitting the trees to fall nearby along paths that branch from the hauling road in the swampy land;

(c) stripping limbs from the tree trunks using an amphibious de-limber to produce logs;

(d) loading the logs onto a self-propelled amphibious log carrier using the amphibious de-limber and a boom mounted on the amphibious log carrier; and (e) hauling the logs from the swampy land to an area that is not swampy using the amphibious log carrier without use of cables to propel the log carrier.

2. The method for harvesting timber of claim 1, further comprising the step of cutting the logs into predetermined lengths using the amphibious de-limber.

3. The method for harvesting timber of claim 2, further comprising the step of servicing the amphibious feller-buncher, the amphibious de-limber and the amphibious log carrier using an amphibious service vehicle.

* * * * *